(12) United States Patent
Bhalla et al.

(10) Patent No.: US 10,652,659 B2
(45) Date of Patent: May 12, 2020

(54) METHODS AND APPARATUS TO FACILITATE TIME SYNCHRONIZATION OF AUDIO OVER BLUETOOTH LOW ENERGY

(71) Applicant: Intel Corporation, Santa Clara, CA (US)

(72) Inventors: Himanshu Bhalla, Bangalore (IN); Xuemei Ouyang, Mountain View, CA (US); Kris D. Fleming, Chandler, AZ (US); Ganesh Venkatesan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/153,459

(22) Filed: Oct. 5, 2018

(65) Prior Publication Data
US 2019/0045304 A1 Feb. 7, 2019

(30) Foreign Application Priority Data
Oct. 5, 2017 (IN) .............................. 201741035247

(51) Int. Cl.
H04R 3/12 (2006.01)
G11B 27/10 (2006.01)
H04R 3/00 (2006.01)

(52) U.S. Cl.
CPC ............... *H04R 3/12* (2013.01); *G11B 27/10* (2013.01); *H04R 3/00* (2013.01); *H04R 2420/07* (2013.01)

(58) Field of Classification Search
None
See application file for complete search history.

(56) References Cited

U.S. PATENT DOCUMENTS

| 6,259,677 B1* | 7/2001 | Jain | H04J 3/0632 370/252 |
| 2008/0226094 A1* | 9/2008 | Rutschman | H04M 1/6066 381/79 |
| 2017/0098466 A1* | 4/2017 | Elliot | G11B 27/10 |
| 2019/0014050 A1* | 1/2019 | Wang | H04L 47/283 |

* cited by examiner

*Primary Examiner* — James K Mooney
(74) *Attorney, Agent, or Firm* — Hanley, Flight & Zimmerman, LLC

(57) ABSTRACT

Example methods and apparatus to facilitate time synchronization of audio over Bluetooth Low Energy are disclosed herein. An apparatus includes a packet processor to process a data packet to identify a timestamp encoded in the data packet; a buffer to store the data packet with the timestamp; and a host to: when the data packet is removed from the buffer, initiate a timer; and when the timer reaches a time corresponding to a sum of the timestamp and a presentation delay time, out the data packet to render the data packet.

20 Claims, 17 Drawing Sheets

METHODS AND APPARATUS TO FACILITATE TIME SYNCHRONIZATION OF AUDIO OVER BLUETOOTH LOW ENERGY

FIELD OF THE DISCLOSURE

This disclosure relates generally to Bluetooth and, more particularly, to methods and apparatus to facilitate time synchronization of audio over Bluetooth Low Energy.

BACKGROUND

Bluetooth Low Energy (e.g., Bluetooth LE, BLE, and/or Bluetooth Smart) is a wireless personal area network technology for exchanging data over short distances from fixed and mobile devices. BLE has been implemented in computing devices related to healthcare, fitness, beacons, security, home entertainment, communications, audio, etc. For example, BLE may be utilized for audio playback on multiple BLE audio sinks (e.g., speakers, earphones, earbuds, etc.), where a master device transmits audio data to one or more slave devices that will output the audio.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
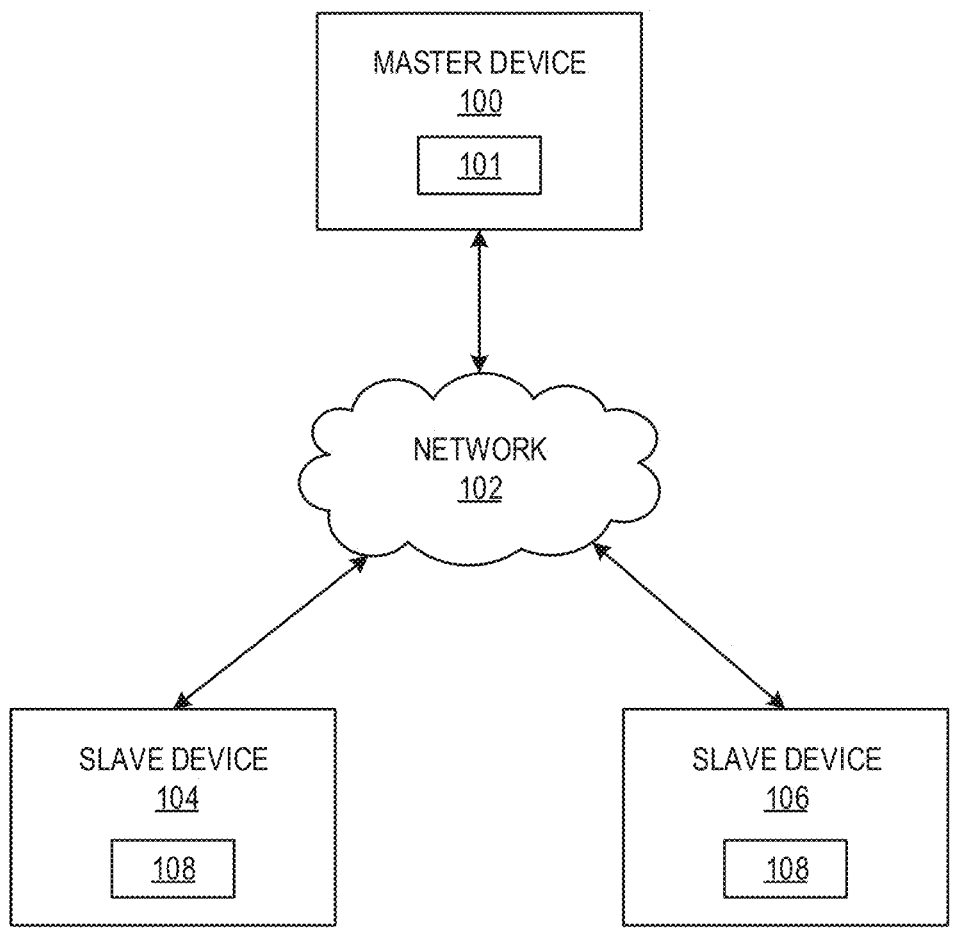
FIG. 1 is an illustration of an example master-slave system to facilitate time synchronization of data to multiple slave devices over Bluetooth using a presentation timestamp (PTS).

BLE technology has increased in popularity and is used to provide wireless connections between devices, such as smart devices (e.g., internet of things (IoT) devices, mobile devices, entertainment devices, smart headphones), due to the low power and low cost of BLE technology. For example, BLE is commonly used to provide audio data for audio playback on multiple BLE audio sinks/slave devices (e.g., speakers, earphones, etc.). In some situations, BLE may be used to connect a master device to two or more slave devices (e.g., speakers, earphones, etc.). In such cases, the master device uses BLE technology to transmit audio data packets to the slave devices for the audio playback. In order for the various slave devices to correctly output the audio to facilitate a fulfilling user experience, the master device and/or slave devices must properly synchronize the audio so that each slave device outputs the proper audio at the same time.

When a master device transmits audio packets to one or more slave devices (e.g., different speakers, earbuds, etc.), the master device calculates and transmits a transport delay (e.g., link delay) to the slave device(s) while establishing a connection. The transport delay, which may be calculated by the master device, corresponds to a maximum time within which the data packets from the master device must arrive at the slave device(s). Packets arriving later than the maximum delay will be flushed due to the way the BLE Connected Isochronous Stream (CIS) works (e.g., for synchronization).

In some examples, the master device transmits data packets to one or more slave devices within a CIS event having parameters corresponding to how the CIS event operates. For example, CIS parameters include Number of Sub-Events (NSE) (e.g., the number of times that the master can send data within a CIS event), Flush Timeout (FT) (e.g., the maximum time duration in units of ISO_Interval (isochronous interval) for which every payload can be transmitted or re-transmitted), and burst number (BN) (e.g., how many data packets should be sent within a CIS event). The CIS Synchronization Delay is the time interval between an anchor point of that CIS and the end of the last subevent of the last CIS within the Connected Isochronous Group (CIG) in an isochronous interval. The transport delay for each CIS is defined as CIS Synchronization Delay added to (FT-1)× ISO_Interval. The master device may calculate the CIS sub-event intervals and the CIS Synchronization Delay for each slave device in an interleaved arrangement based on the below Equations.

$$CIS(n)_{Subevent_{interval}} \geq \qquad \text{(Equation 1)}$$

$$\sum_{m=1}^{m=NumCIS} \left( CIS(m)_{MaxTx_{time}} + CIS(m)_{MaxRx_{time}} + T_{IFS} + T_{sub} \right),$$

where $T_{sub} \geq T_{MSS}$ (Minimum Subevent spacing)

For $n = 1$, $CIS(1)_{Syncronization\_Delay} =$ (Equation 2)

$$\sum_{m=1}^{m=NumCIS} \left( CIS(m)_{MaxTx_{time}} + CIS(m)_{MaxRx_{time}} T_{IFS} + T_{sub} \right) *$$

$$CIS(n)_{NSE}$$

For $n > 1$, $CIS(n)_{Syncronization\_Delay} =$ (Equation 3)

$$CIS(1)_{Syncronization\_Delay} - \sum_{m=1}^{m=n-1} \left( CIS(m)_{MaxTx_{time}} + CIS(m)_{MaxRx_{time}} + T_{IFS} + T_{sub} \right),$$

where $CIG_{Syncronrzation\_Delay} = CIG(1)_{Syncronization\_Delay=}$

The $CIS(n)_{Subevent\_internal}$ is greater than or equal to the window widening, which is equal to 6×CIS(n)$_{Interval}$×(MasterSCA (e.g., sleep clock accuracy)+Slave SCA)/1000000)+ 16 microseconds), assuming 3 missed connected Isochronous events.

Conventional techniques for facilitating data synchronization (e.g., audio synchronization) include utilizing the transport delay (e.g., as described above) and a presentation/processing delay. The presentation/processing delay depends on the time it takes for the slave device to process and out the data to be rendered by another device (e.g., a speaker or amplifier). In such conventional techniques, the slave device uses the processing delay and the received transport delay to generate an output from the data. Such conventional techniques include using a Host level protocol to communicate a common processing delay to all slave devices. However, such conventional techniques depend on processing delay to be accurate across slaves. Processing delay is dependent on the implementation of decoding and rendering data on each of the slave devices. Accordingly, when processing delay is split across Bluetooth and host clocks and both clocks are different, it is undetermined how presentation delay can be used with conventional techniques. Additionally, a slave device may include a host to perform both decoding and facilitating the rendering of data packets using a jitter buffer mechanism. Accordingly, such conventional techniques cannot specify processing delay. Additionally, when host software changes (e.g., due to software or firmware upgrades), conventional techniques require recalculation of processing delay after each upgrade which is tedious to calculate.

Examples disclosed herein use 802.1AS IEEE protocol over Bluetooth with a presentation timestamp (PTS)/application timestamp (ATS) derived from a host clock of a master device to synchronize audio playback on multiple slave devices (e.g., sinks) which are connected to the same master (e.g., source) device over an BLE CIS connection, thereby calculating the transport delay. The example slave devices use the PTS/ATS to help synchronize audio across all the slave devices. Examples disclosed herein include the master device using the header of a data payload to include the PTS/ATS to trigger how slave devices should synchronize. In this manner, examples disclosed herein can simplify the controller logic of determining and using transport and processing delay and considers BLE Isochronous channel as a data pipe. Additionally, examples disclosed herein offload the decision of when to present the payload for rendering to the host based on the PTS/ATS. Some examples disclosed herein also solve cases when jitter buffers are used in the host (e.g., for decoding and rendering data) and each packet of jitter buffer may have a specified time of presentation.

FIG. 1 illustrates an example master-slave system to facilitate time synchronization of data to multiple slave devices over Bluetooth using PTS/ATS. The example of FIG. 1 includes an example master device 100, an example data synchronization transmitter 101, an example network 102, example slave devices 104, 106, and an example data synchronizer 108. Although the illustrated example of FIG. 1 includes two slave devices 104, 106, there may be any number of slave devices that are connected to the example master device 100. Although the example of FIG. 1 is described in conjunction with audio data, examples disclosed herein may be utilized with other types of data that require time synchronization. For example, disclosed examples may be utilized to facilitate distributed coordinated sensor information collection over BLE Mesh.

The example master device 100 of FIG. 1 is a source computing device that transmits data packets (e.g., protocol data units (PDUs)), via the example network 102, to the example slave devices 104, 106. For example, the master device 100 may be a mobile phone that is transmitting audio data to the example slave devices 104, 106 (e.g., wireless audio speakers or ear buds). Alternatively, the example master device 100 may be a single source multi-sink multi-channel audio device (e.g., Dolby 5.1), a computer, a media device, a laptop, a tablet, a personal assistant, an amplifier, a set-top-box, a DVD player, a receiver, a server, an access point, and/or any device capable of transmitting data packets via a wireless network connection. The example master device 100 includes the example data synchronization transmitter 101.

The example data synchronization transmitter 101 of FIG. 1 establishes a connection with the example slave devices 104, 106 to transmit data packets (e.g., via the example network 102) to synchronized by the slave devices 104, 106 based on the information stored in the data packets. For example, when the master device 100 is to transmit data to the example slave devices 104, 106, the example data synchronization transmitter 101 timestamps the initial transmission of a data packet to either one of the slave devices 104, 106. Additionally, the example data synchronization transmitter 101 determines the presentation delay from the transport delay (e.g., the presentation delay is greater or equal to the transport delay). As explained above, the transport delay corresponds to the time required for a data packet to be either received or flushed. The example data synchronization transmitter 101 transmits the transport delay to the slave devices 104, 106 (e.g., using the protocol described below in conjunction with FIG. 3). In this manner, the example slave devices 104, 106 can process and out the received data packets to be rendered based on the PTS/ATS and the presentation delay. In some examples, the data synchronization transmitter 101 may timestamp multiple payloads (e.g., data packets) at the same time to group multiple payloads with the same PTS/ATS.

Additionally, the example data synchronization transmitter 101 of FIG. 1 facilitates a clock synchronization using 802.1AS over Bluetooth. In this manner, the slave devices 104, 106 can detect a difference between the clock of the master device 100 and the slave device 104, 106. The slave devices 104, 106 correct their clock based on the difference so that the clock between the master device 100 and the slave devices 104, 106 are synchronized. An example of how the 802.1AS may be used over a BLE link using BLE data packets is further described below in conjunction with FIG. 3. The example data synchronization transmitter 101 is further described below in conjunction with FIG. 2.

The example network 102 of FIG. 1 is a system of interconnected systems exchanging data. In the illustrated example of FIG. 1, the example network 102 is a personal area network for wirelessly exchanging data. Alternatively, the example network 102 may be implemented using any type of public or private network such as, but not limited to, the Internet, a telephone network, a local area network (LAN), a cable network, and/or a wireless network.

The example slave devices 104, 106 are devices that perform a function based on receive instructions from the example master device 100. For example, the slave devices 104, 106 may be speakers (e.g., wireless speakers), earbuds (e.g., wireless earbuds, APPLE AirPods, etc.), and/or any other computing device that is capable of receiving and executing instructions. In the illustrated example, the slave devices 104, 106 are not connected to each other. Accordingly, the example slave devices 104, 106 require a synchronization protocol to ensure that the two slave devices 104, 106 output the same audio, or corresponding audio, at the same time. The example slave devices 104, 106 include the example data synchronizer 108.

The example data synchronizer 108 of FIG. 1 to perform the synchronization protocol using the PTS/ATS. The example data synchronizer 108 receives data packets from the example master device 100 and processes the data packets to determine the PTS/ATS of the data packet. In some examples, the example data synchronizer 108 includes a jitter buffer (e.g., a queue) to store received data packets in conjunction with the corresponding timestamp. In such examples, at a predefined time (e.g., when the jitter buffer includes over a threshold number of data packets), the data synchronizer 108 pops (e.g., removes) the payload (e.g., the first entered data packet(s)), which may include decoding the payload. Once the payload is popped (e.g., removed from the buffer), the data synchronizer 108 initiates a timer (e.g., tracks time based on the example clock 207) and outputs the payload to be rendered (e.g., to play or output the audio to a speaker or other device) at a time corresponding to a sum of the PTS/ATS and the presentation delay time. Because all the slave devices 104, 106 are synchronized with the example master device 100, the slave devices 104, 106 facilitate the rendering of the payload at the same time. The example data synchronizer 108 is further described below, in conjunction with FIG. 2.

Figure 2:
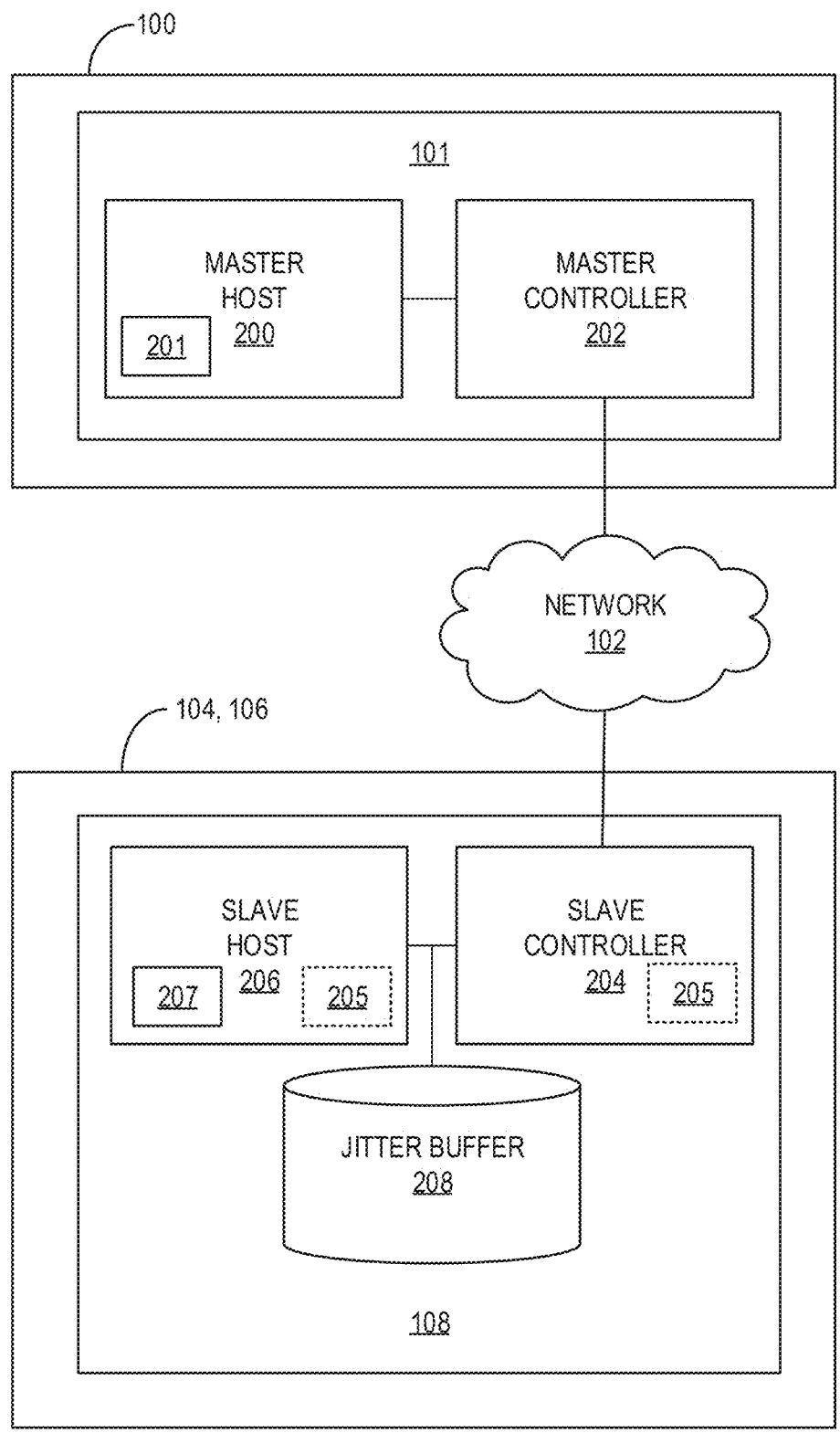
FIG. 2 is a block diagram of an example implementation of the example data synchronization transmitter and an example data synchronizer of FIG. 1.

FIG. 2 is a block diagram of an example implementation of the example data synchronization transmitter 101 and the example data synchronizer 108 of FIG. 1, disclosed herein, to facilitate synchronization of data to multiple slave devices over Bluetooth. The example data synchronization transmitter 101 includes an example master host 200, an example master host clock 201, and an example master controller 202 and the example data synchronizer 108 includes an example slave controller 204, an example packet processor 205, an example slave host 206, an example slave host clock 207, and an example jitter buffer 208.

The example master host 200 of FIG. 2 is an application processor that encodes data and timestamps the payload with host presentation timestamps (e.g., PTS or ATS). The master host 200 includes the example timer/clock 201 to track time in order to generate the timestamps. The example master host 200 may instruct the master controller 202 to perform a clock synchronization with the example slave devices 104, 106 so that the clock 201 of the master host 200 is in sync with the clock 207 of the example slave host 206. The example master host 200 determines a fixed presentation delay that is communicated to the example slave devices 104, 106 (e.g., via the example master controller 202). In some examples, the presentation delay may be derived from the transport delay. The example master host 200 is further described below in conjunction with the example application processor/host of FIG. 10.

The example master controller 202 of FIG. 2 facilitates the clock synchronization between the devices 100, 104, 106. Additionally, the master controller 202 uses BLE isochronous channel to send payload (e.g., data packets) to the slave devices 104, 106. Additionally, the master controller 202 performs any necessary retransmissions when an acknowledgement (ACK) of a transmitted data packet is not received. The example master controller 202 communicates with the example slave controller 204 via the example network 102.

The example slave controller 204 of FIG. 2 receives the payloads according to the BLE isochronous channel standard. The example packet processor 205 decodes received data packets to identify information encoded within the data packets. The example packet processor 205 may be included in (e.g., implemented by) the example slave controller 204 and/or the example slave host 206. When the example packet processor 205 is implemented by the example slave host 206, the example slave controller 204 relays the payload to the slave host 206 for processing. When the example packet processor 205 is implemented by the example slave controller, the packet processor 205 decodes a received data packet prior to relaying the data packet to the slave host 206.

The example slave host 206 of FIG. 2 receives the payload (e.g., the received data packets) from the slave controller 204 and buffers the payload by storing the data packets in the example jitter buffer 208. The example jitter buffer 208 is a queue-type buffer that stores a preset amount of data packets. Once the example jitter buffer 208 has stored more than a threshold amount of data packets and/or after a threshold amount of time, the slave host 206 removes (e.g., pops out) the first stored data packet and/or a group of data packets from the jitter buffer 208. In some examples, the example slave host 206 decodes the popped data packets. Once popped and/or decoded, the example slave host 206 initiates the example clock/timer 207 and facilitates the rendering of the payload based on the PTS/ATS of the data packet and the presentation delay time. For example, the slave host 206 may output the data packet(s) to a device to render the data packet(s) based on a sum of the PTS/ATS and the presentation delay. In some examples, the slave host 206 synchronizes the clock/timer 207 based on instructions from the master device 100. For example, the slave host 206 may synchronize and syntonize (e.g., the slave clock and the master clock will have the same time and same tick counter within some amount of tolerance) based on an 802.1AS protocol to detect clock difference between peer devices. In this manner, the example slave host 206 can adjust the clock 207 based on the protocol, thereby synchronizing and syntonizing with the clock 201 of the master host 200, as further described below in conjunction with FIG. 3.

Figure 3:
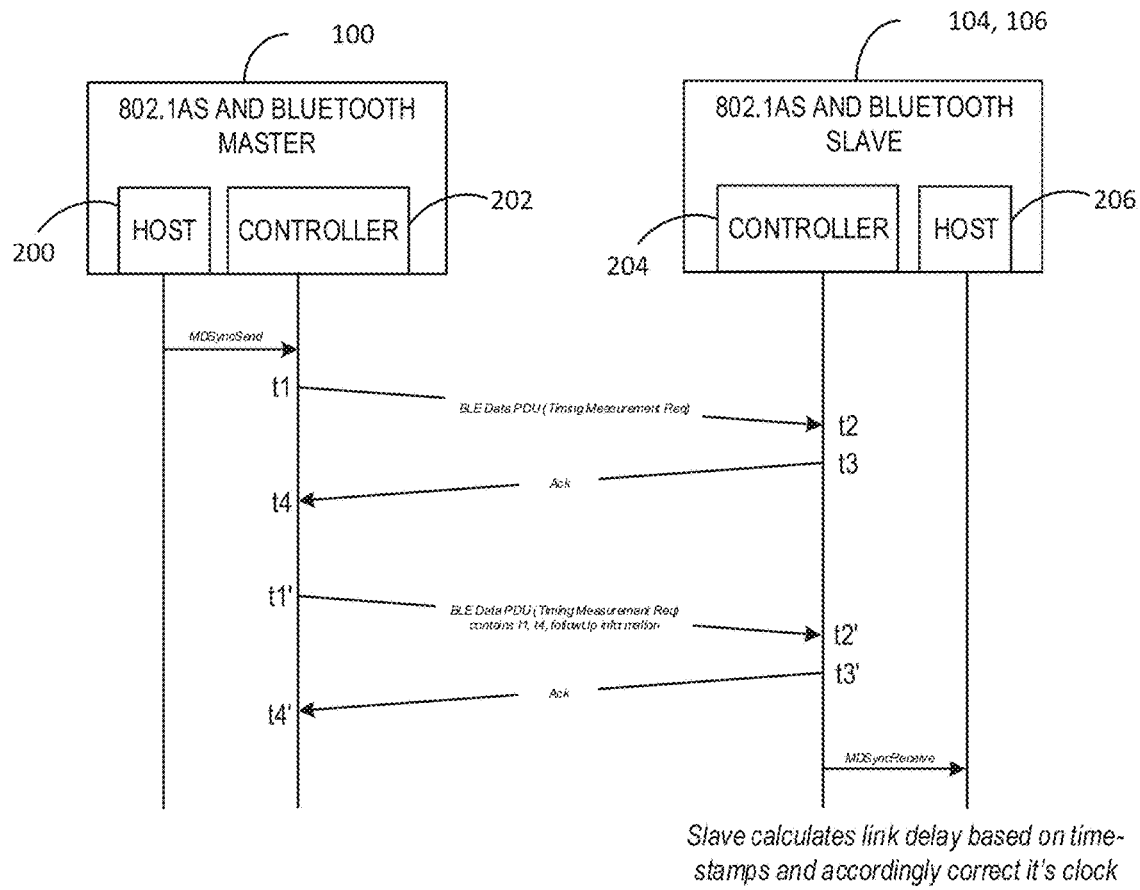
FIG. 3 is a timing diagram of an example communication between an example master device and an example slave device to facilitate a clock synchronization.

FIG. 3 is a timing diagram of a communication between the example master device 100 and one of the example slave devices 104, 106 to facilitate a clock synchronization using an 802.1AS protocol over a BLE link using BLE data packets (e.g., PDUs). The example of FIG. 3 includes the example master device 100, the example slave device 104, 106, the example master host 200, the example master controller 202, the example slave controller 204, and the example slave host 206 of FIGS. 1 and/or 2. Although, conventional 802.11AS is structured to include a media independent layer and four media dependent layers (e.g., full-duplex point-to-point (P2P) Ethernet, Ethernet using passive optical network (EPON), IEEE 802.11 wireless, and generic coordinated shared networks (CSNs) including multimedia over coax alliance (MoCA), G.hn, etc.), examples disclosed herein include a fifth media dependent layer dedicated to Bluetooth and/or BLE, as further described below in conjunction with FIG. 9. Accordingly, FIG. 3 is an example similar to the protocol exchanges over Wi-Fi for measuring drift. Alternatively, other techniques may be used to synchronize the clocks 201, 207 between the example master device 100 and the example slave device 104, 106.

To facilitate time synchronization, the example master host 200 transmits a MDSyncSend message to the example master controller 202 to instruct the master controller 202 to facilitate the time synchronization protocol. Once the example master controller 202 receives the MDSyncSend instruction, the example master controller 202 transmits a BLE Data PDU to the example slave controller 204 via the example network 102. The BLE Data PDU is a timing measurement request that includes a timestamp (t1) of when the BLE Data PDU was transmitted. Once the example slave controller 204 receives the BLE Data PDU, the slave controller 204 timestamps the retrieval (t2) and generates an ACK that is also timestamped (t3). Once the example master controller 202 receives the ACK, the master controller 202 timestamps the retrieval (t4). The example master host 200 transmits a second BLE data PDU including the timestamps t1 and t4 along with other follow-up information and/or a timestamp (t1') that may be defined in the 802 protocols to the example slave controller 204. The example slave controller 204 timestamps the retrieval of the BLE data PDU (t2') and transmits an ACK. Once the slave controller 204 receives the BLE data PDU, the example slave controller 204 transmits a MDSyncReceive instruction to the example slave host 206. The MDSyncReceive instructions includes one or more of the timestamps. In this manner, the example slave host 206 can calculate the link delay (e.g., transport delay) according to the timestamps and correct the clock 207 to sync with the clock 201 of the example master host 200 based on the link delay/transport delay. For example, the slave host 206 may sync the clock 207 to the master clock 201 based on parameters of the timestamps, the link delay, and an a rate ratio corresponding to the timestamps.

The example process of FIG. 3 may be done periodically, a periodically, and/or based on a trigger. For example, the process of FIG. 3 may occur continuously (e.g., 3 or more times per second) and/or may occur prior to each transmission. In some examples, the master device 100 and the slave devices 104, 106 may support both Wi-Fi and Bluetooth. In such examples, the host clock may be synchronized using 802.1AS over Wi-Fi and the data packets may be timestamped and sent over Bluetooth. Such examples may be useful when Wi-Fi is busy with cloud streaming (e.g., video and audio). Thus, BLE may be used for audio streaming to 5.1 speakers, for example, while Wi-Fi is used for time synchronization.

While an example manner of implementing the example data synchronization transmitter 101 and the example data synchronizer 108 of FIG. 1 is illustrated in FIG. 2, one or more of the elements, processes and/or devices illustrated in FIG. 2 may be combined, divided, rearranged, omitted, eliminated and/or implemented in any other way. Further, the example master host 200, the example master controller 202, and/or, more generally, the example data synchronization transmitter 101 of FIG. 2 and the example slave controller 204, the example slave host 206, the example jitter buffer 208, and/or more generally the example data synchronizer 108 of FIG. 2 may be implemented by hardware, software, firmware and/or any combination of hardware, software and/or firmware. Thus, for example, any of the example master host 200, the example master controller 202, and/or, more generally, the example data synchronization transmitter 101 of FIG. 2 and the example slave controller 204, the example slave host 206, the example jitter buffer 208, and/or more generally the example data synchronizer 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example master host 200, the example master controller 202, and/or, more generally, the example data synchronization transmitter 101 of FIG. 2 and the example slave controller 204, the example slave host 206, the example jitter buffer 208, and/or more generally the example data synchronizer 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data synchronization transmitter 101 of FIG. 2 and/or the example data synchronizer 108 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
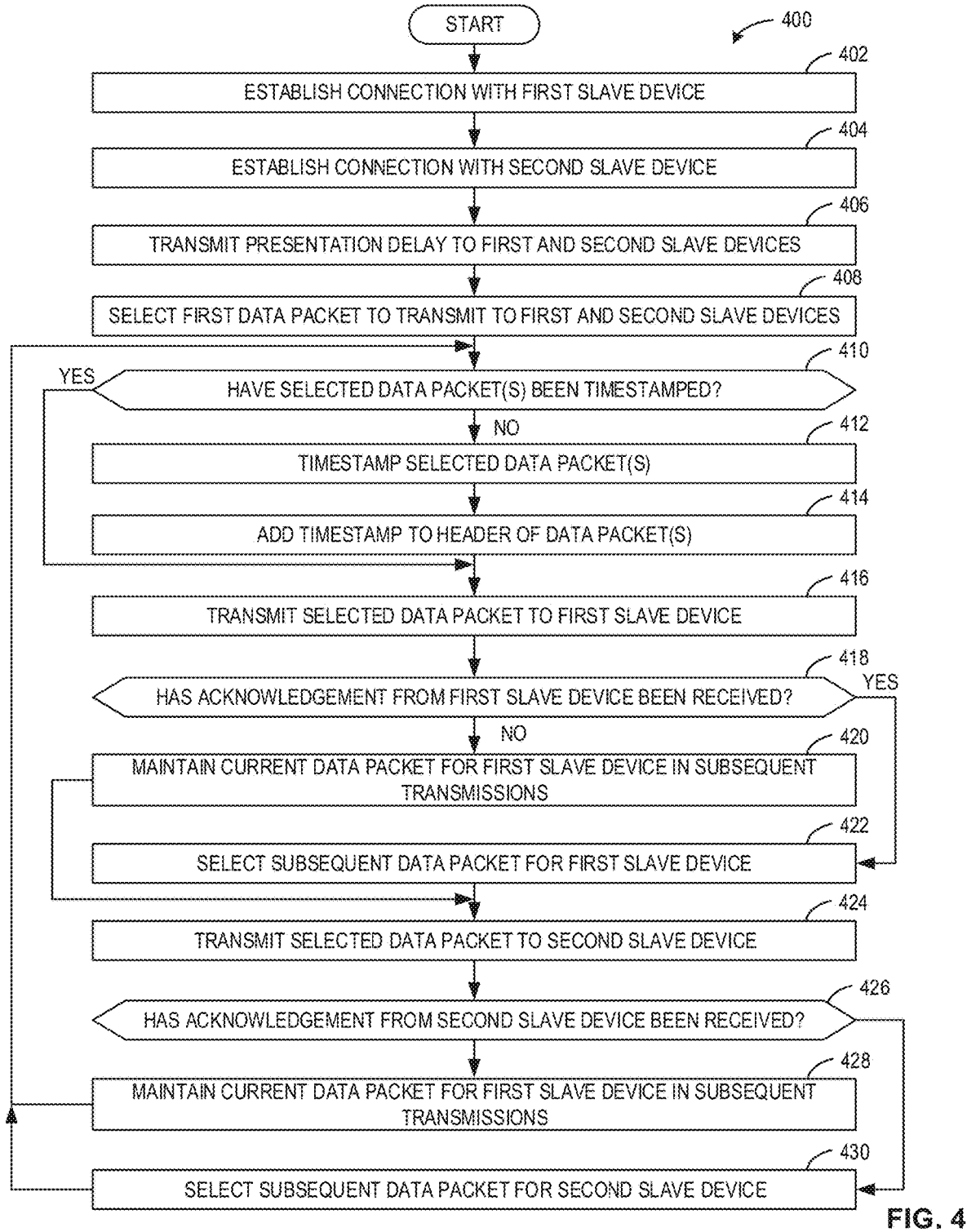
FIG. 4 is a flowchart representative of example machine readable instructions that may be executed to implement the example data synchronization transmitter of FIG. 1.
Figure 5:
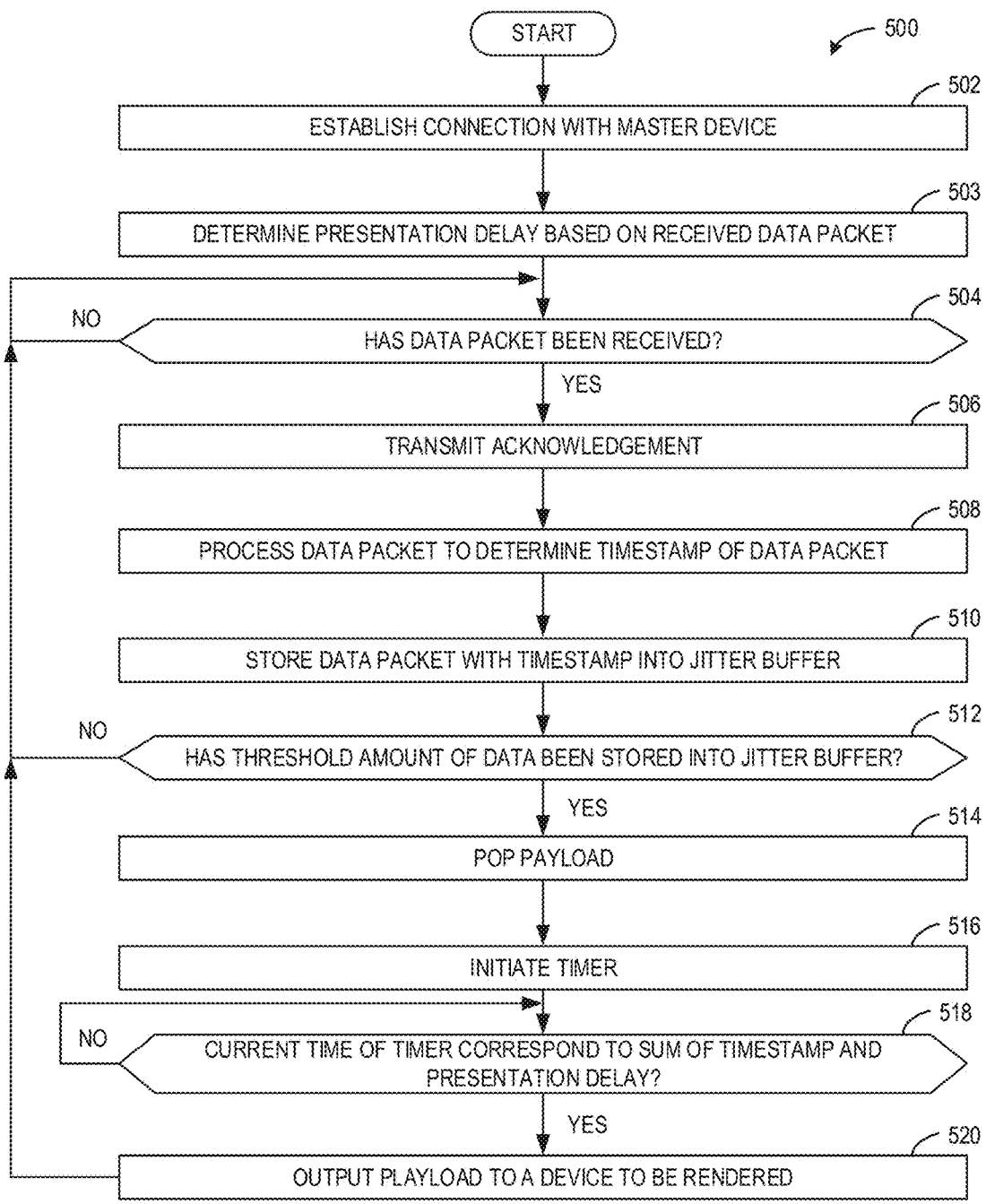
FIG. 5 is a flowchart representative of example machine readable instructions that may be executed to implement the example data synchronizer of FIG. 1.

A flowchart representative of example hardware logic, machine readable instructions, hardware implemented state machines, and/or any combination thereof for implementing the example data synchronization transmitter 101 of FIG. 2 is shown in FIG. 4 and a flowchart representative of example machine readable instructions for implementing the example data synchronizer 108 of FIG. 2 is shown in FIG. 5. The machine readable instructions may be an executable program or proton of an executable program for execution by a processor such as the processor 1412, 1512 shown in the example processor platform 1400, 1500 discussed below in connection with FIGS. 14 and 15. The program may be embodied in software stored on a non-transitory computer readable storage medium such as a CD-ROM, a floppy disk, a hard drive, a digital versatile disk (DVD), a Blu-ray disk, or a memory associated with the processor 1412, 1512, but the entire program and/or parts thereof could alternatively be executed by a device other than the processor 1412, 1512 and/or embodied in firmware or dedicated hardware. Further, although the example program is described with reference to the flowchart illustrated in FIGS. 4-5, many other methods of implementing the example data synchronization transmitter 101 and/or the example data synchronizer 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.), as a preamble or within a claim recitation of any king, it is to be understood that additional elements, terms, etc. may be present without falling outside the scope of the corresponding claim or recitation. As used herein, when the phrase "at least" is used as the transition term in a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is an example flowchart 400 representative of example machine readable instructions that may be executed by the example data synchronization transmitter 101 of FIG. 2 to facilitate synchronization of data to multiple slave devices over Bluetooth. Although the example flowchart 400 of FIG. 4 is described in conjunction with the example master device 100 and the example slave devices 104, 106 of FIG. 1, the flowchart 400 may be utilized by any type or number of master and/or slave devices.

At block 402, the example master controller 202 establishes a connection with the first slave device 104. For example, the master controller 202 may transmit an asynchronous connection-less (ACL) Bluetooth communication protocol to the first slave device 104 to establish a connection. While establishing the connection, the example master controller 202 transmits a data packet including a transport delay (e.g., a link delay) to the slave devices 104, 106. The transport delay corresponds to a maximum time within which the data packets from the master device will either arrive at the slave device(s) 104, 106 or will be flushed due to the way the CLE CIS works for synchronization. At block 404, the example master controller 202 establishes a connection with the second slave device 106. At block 406, the example master controller 202 transmits a presentation delay (e.g., a fixed presentation delay) to the first and second slave devices 104, 106. In some examples, the presentation delay may be calculated by the example host based on the transportation delay (e.g., the presentation delay is greater than or equal to the transport delay). The presentation delay corresponds to an amount of time to allow for jitter buffering and network jitters because the time at which the audio playback is send from the source (e.g., the master device 100) is not the actual time at which it needs to be played. The audio playback should be played somewhere in the future because network jitters may be needed to go from source to sink. Accordingly, the presentation delay corresponds to the amount of time needed to allow for jitter buffering and network jitters.

At block 408, the example master host 200 selects a first data packet (e.g., payload) to transmit to the first and second slave devices. At block 410, the example master host 200 determines if the selected data packet(s) have been timestamped. Initially, the data packets are not timestamped, but if a retransmission of a timestamp occurs, the data packet is not re-timestamped. If the example master host 200 determines that the selected data packet(s) have already been timestamped (block 410: YES), the process continues to block 416. If the example master host 200 determines that the selected data packet(s) have not already been timestamped (block 410: NO), the example master host 200 timestamps the selected data packet(s) (block 412). For example, the master host 200 includes a PTS/ATS with the data packet (e.g., the PTS/ATS is encoded in a header of the data packet), as further described below in conjunction with FIG. 8C. At block 414, the example master controller 202 transmits the selected data packet (e.g., with the PTS/ATS) to the first example slave device 104. At block 418, the example master controller 202 determines if an ACK from the first example slave device 104 has been received. If the example master controller 202 determines that an ACK from the first slave device 104 has not been received (block 418: NO), the example master hosts 200 maintains the current data packet for the first slave device in a subsequent (e.g., next) transmission (block 420). In this manner, the example data synchronization transmitter 101 continues to send the first data packet to the first slave device 104 until an ACK is received. If the example master controller 202 determines that an ACK from the first slave device 104 has been received (block 418: YES), the example master hosts 200 selects a subsequent data packet for the first slave device 104 in a subsequent (e.g., next) transmission (block 422).

At block 424, the example master controller 202 transmits the selected data packet (e.g., with the PTS/ATS) to the second example slave device 106. At block 426, the example master controller 202 determines if an ACK from the second example slave device 106 has been received. If the example master controller 202 determines that an ACK from the second slave device 106 has not been received (block 426: NO), the example master hosts 200 maintains the current data packet for the second slave device 106 in a subsequent (e.g., next) transmission (block 428). In this manner, the example data synchronization transmitter 101 continues to send the first data packet to the second slave device 106 until an ACK is received. If the example master controller 202 determines that an ACK from the second slave device 106 has been received (block 426: YES), the example master hosts 200 selects a subsequent data packet for the second slave device 106 in a subsequent (e.g., next) transmission (block 430). This process continues until all of the data packets have successfully been transmitted to the example slave devices 104, 106.

FIG. 5 is an example flowchart 500 representative of example machine readable instructions that may be executed by the example data synchronizer 108 of FIG. 2 to facilitate synchronization of data to multiple slave devices over Bluetooth. Although the example flowchart 500 of FIG. 5 is described in conjunction with the example master device 100 and slave devices 104, 106 of FIG. 1, the flowchart 500 may be utilized by any type or number of master and/or slave devices. The flowchart 500 of FIG. 5 assumes that the clock (e.g., the example clock 207) of the example slave devices 105, 106 are synchronized with the clock of the example master devices 100 (e.g., the example clock 201), as further described above in conjunction with FIG. 3.

At block 502, the example slave controller 204 establishes a connection with the master device 100. For example, the slave controller 204 may receive an asynchronous connection-less (ACL) Bluetooth communication protocol from the master device 100 to establish a connection. In some examples, the slave controller 204 receives a data packet including a transport delay while establishing the connection (e.g., the packet controller 205 decodes the transport delay from the data packet). At block 503, the example packet processor 205 determines a processing delay based on a received data packet from the master device 100. As further described below, the processing delay is used to render a payload stored in the example jitter buffer 208. At block 504, the example slave controller 204 determines if a data packet (e.g., payload) has been received (e.g., via the example network 102). If the example slave controller 204 determines that the data packet has not been received (block 504: NO), the process continues to monitor the network 102 until a data packet is received from the example slave device 104, 106. If the example slave controller 204 determines that the data packet has been received (block 504: YES), the example slave controller 204 transmits an ACK (block 506).

At block 508, the example packet processor 205 processes the data packet to determine the timestamp (e.g., with the PTS/ATS) of the data packet. In some examples, the packet processor 205 may decode the data packet to determine the timestamp (e.g., by decoding the header of the data packet). At block 510, the example jitter buffer 208 stores the example data packet with the timestamp. At block 512, the example slave host 206 determines if a threshold amount of data packets have been stored into the jitter buffer 208. If the example slave host 206 determines that a threshold amount of data has not stored in the example jitter buffer 208 (block 512: NO), the process returns to block 504 to receive additional data packets. If the example slave host 206 determines that a threshold amount of data has been stored in the example jitter buffer 208 (block 512: YES), the example slave host 206 pops (e.g., removes) pops out the payload (e.g., the stored data packets) from the jitter buffer 208 (block 514).

At block 516, the example slave host 206 initiates a timer. For example, the slave host 206 may track a time based on the example clock/timer 207. At block 518, the example slave host 206 determines if the current time (e.g., tracked by the timer) corresponds to a sum of the timestamp and the presentation delay. As described above, the slave host 206 is to output the data to be rendered the payload by initiating a timer when the payload is popped and outputting each data packet after an amount of time corresponding to a sum of the PTS/ATS of the data packet and the presentation delay time unit. If the example slave host 206 determines that the current time of the timer does not correspond to the sum of the timestamp and the presentation delay (block 818: NO), the slave host 206 waits until the time does correspond to the sum. If the example slave host 206 determines that the current time of the timer corresponds to the sum of the timestamp and the presentation delay (block 818: YES), the slave host 206 outputs the payload to a device (e.g., a speaker) to be rendered by the device (block 520). Because all the slave devices 104, 106 are synchronized with the master device 100, the slave devices 104, 106 ensures that the payload is rendered at the same time.

Figure 6:
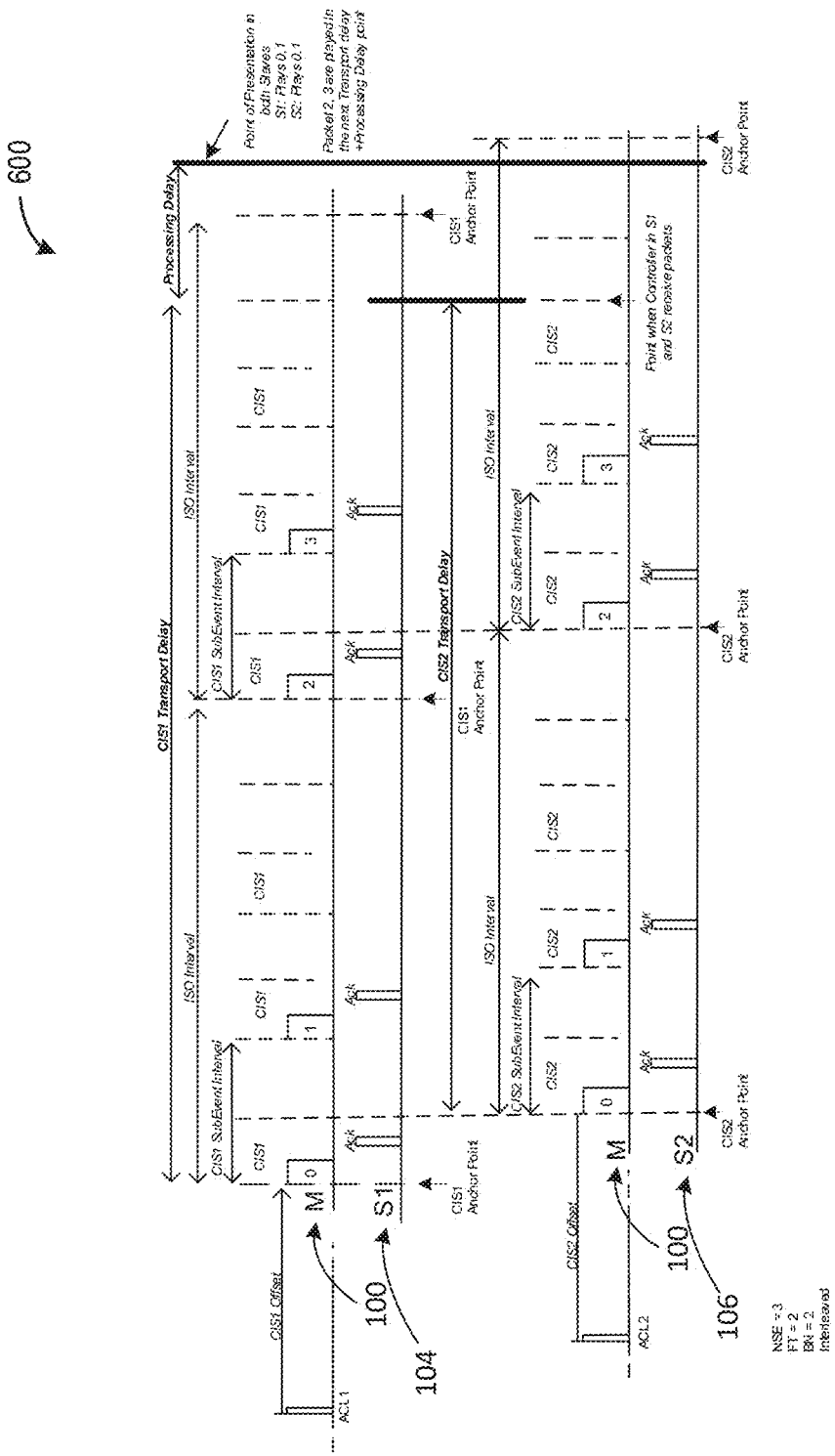
FIG. 6 is an example timing diagram of a conventional technique for transmitting data to example slave devices of FIG. 1.

FIG. 6 is an example timing diagram 600 of a conventional technique for transmitting data to the example slave devices 104, 106. The example timing diagram 600 includes the example master device 100, the first example slave device 104, and the second example slave device 106 of FIG. 1. The example timing diagram 600 illustrates an example where there is no loss and retransmission in the link. The timing diagram 600 is based on CIS link parameters, where NSE is 3, FT is 2, BN is 2 and the method is interleaved. The data packets are labelled based on numbers (e.g., 0, 1, 2, 3).

In the example timing diagram 600, the master host 200 may consider jitter buffers which are larger than the BN of 2 (e.g., when the decode and render are done by the example slave host 206). However, such a consideration makes the determination of the processing delay to be unclear. Even though the CIS channel parameters (e.g., NSE, BN, FT, etc.) are indirectly controlled by the master host 200, the master host 200 may not be able to determine these parameters and their relationship with the jitter buffer(s). Additionally, any change in the decode and/or render implementation results in a processing delay change. Accordingly, it may be unclear how accurately the parameter may be derived after an update is deployed.

Figure 7:
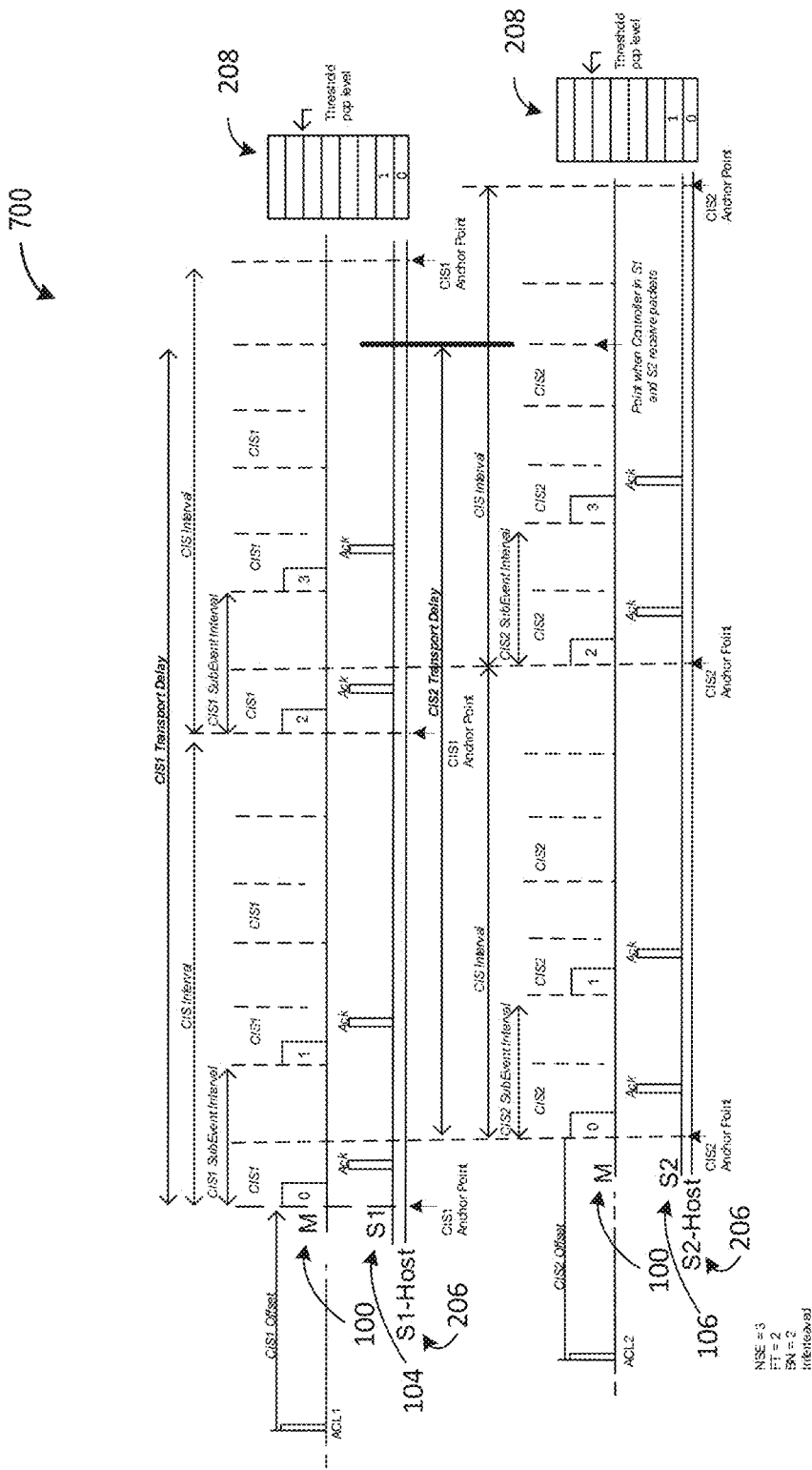
FIG. 7 is an example timing diagram of a conventional technique for transmitting data to the example slave devices while utilizing an example jitter buffer of FIG. 2.

FIG. 7 is an example timing diagram 700 of a conventional technique for transmitting data to the example slave devices 104, 106 while utilizing the example jitter buffer 208 of FIG. 2. The example timing diagram 700 includes the example master device 100, the first example slave device 104, the second example slave device 106, the example slave host 206, and the example jitter buffer 208 of FIGS. 1-2. The example timing diagram 700 illustrates an example where there is no loss and retransmission in the link. The timing diagram 700 is based on CIS link parameters, where NSE is 3, FT is 2, BN is 2 and the method is interleaved. The data packets are labelled based on numbers (e.g., 0, 1, 2, 3).

As shown in the timing diagram 700, when a data packet is received, the data packet is stored in the example jitter buffer 208. As described above, the jitter buffer 208 may store the data packets until a predefined point in time. In some examples, the predefined point in time corresponds to a threshold number of data packets that has been stored in the jitter buffer 208. After the predefined time has ceased, the salve host 206 pops/removes the data packet from the jitter buffer 208 for rendering. The example jitter buffer 208 is being used at the slave host layer, so additional coordination is needed between the slave controller 204 and the slave host 206 and the jitter buffer is variable based on how the network works. Accordingly, it is unclear how processing delay would be used with the example jitter buffer 208.

Figure 8A:
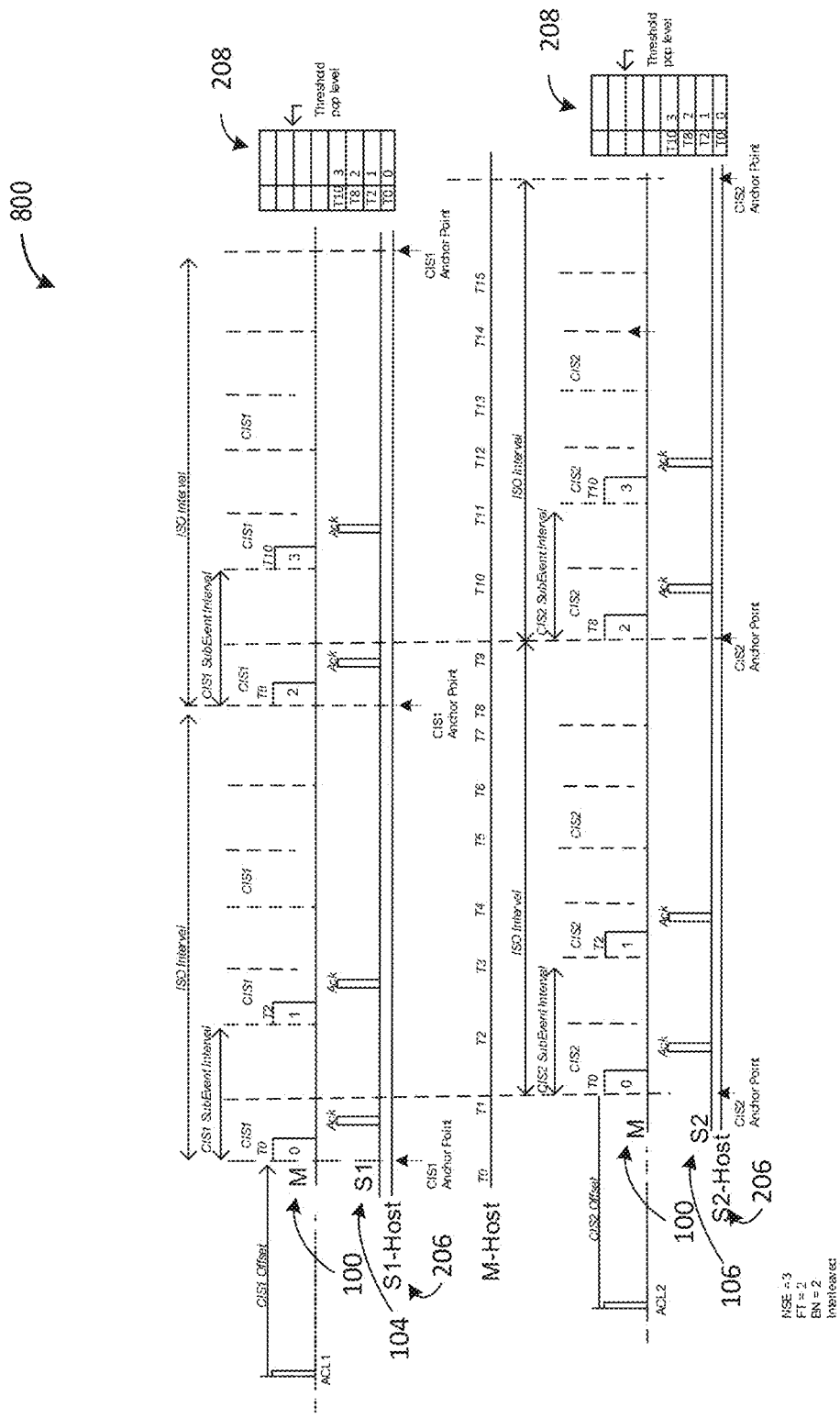
FIG. 8A is an example timing diagram illustrating an outputting of synchronized data packets using the example slave devices while utilizing the example jitter buffer of FIG. 2.

FIG. 8A is an example timing diagram 800 illustrating an outputting of synchronized data packets using the example slave devices 104, 106 while utilizing the example jitter buffer 208 of FIG. 2. The example timing diagram 800 includes the example master device 100, the first example slave device 104, the second example slave device 106, the example slave host 206, and the example jitter buffer 208 of FIGS. 1-2. The example timing diagram 800 illustrates an example where there is no loss and retransmission in the link. The timing diagram 800 are based on CIS link parameters, where NSE is 3, FT is 2, BN is 2 and the method is interleaved. The data packets are labelled based on numbers (e.g., 0, 1, 2, 3). Additionally or alternatively, other CIS link parameters and/or different data packets may be utilized.

As shown in the timing diagram 800, when a data packet is received, the data packet is stored in the example jitter buffer 208. As described above, the jitter buffer 208 may store the data packets until a predefined point in time. In some examples, the predefined point in time corresponds to a threshold number of data packets that has been stored in the jitter buffer 208. After the predefined time has ceased, the data packet is removed from the jitter buffer for rendering. However, unlike the conventional techniques of timing diagrams 600, 700 of FIGS. 6-7, the example master device 100 transmits a timestamp with each data packet corresponding to when the data packet was first transmitted. Accordingly, data packet 0 includes timestamp T0, data packet 1 includes timestamp T2, data packet 2 includes timestamp T8, and data packet 3 includes timestamp T10. Accordingly, the example jitter buffer 208 stores the corresponding timestamp in conjunction with the data packet. In this manner, the example slave host 206 of the example slave devices 104, 106 is able initiate a timer/clock and render the popped data packets based on a sum of the presentation delay and the PTS/ATS (e.g., timestamp). As described above, because the clocks 201, 207 among the master device 100 and the slave devices 104, 106 are synchronized, the rendered data from each slave device 104, 106 will be synchronized.

Figure 8B:
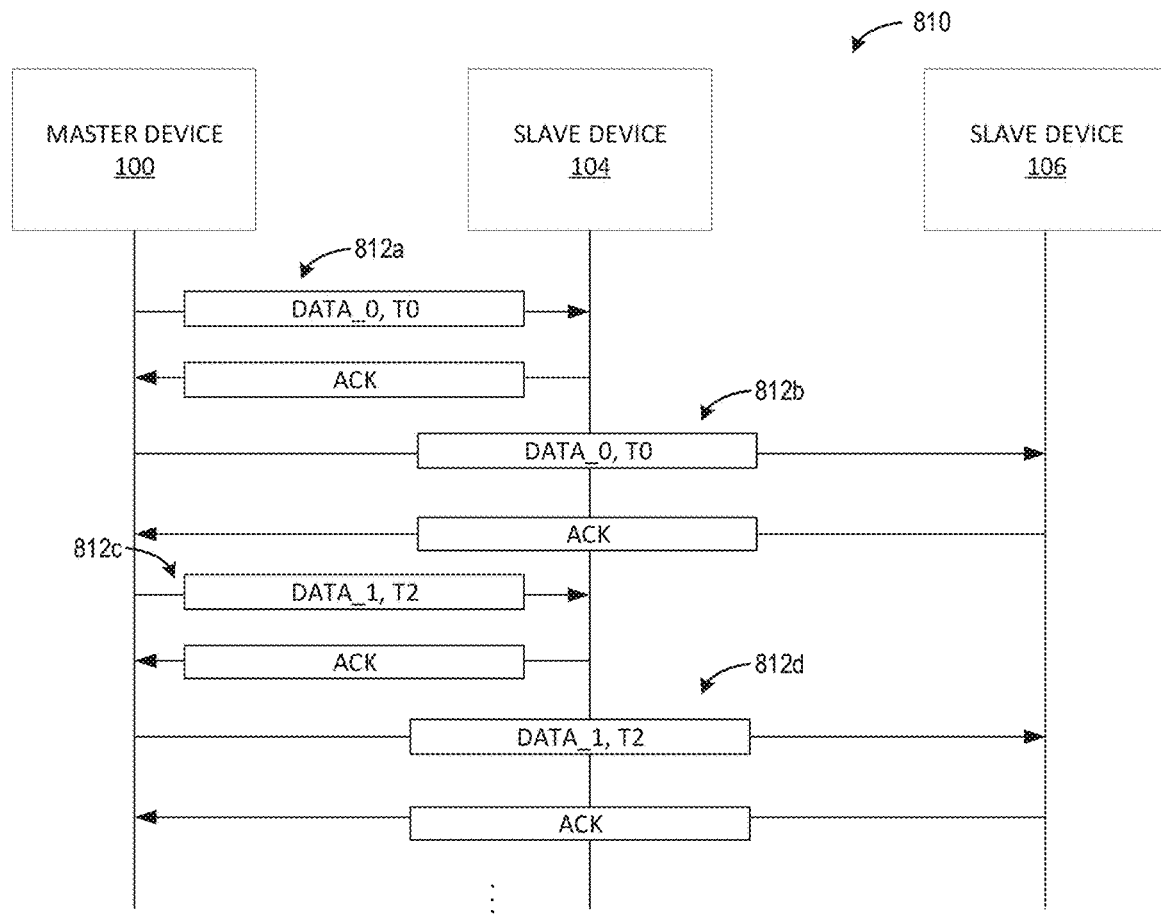
FIG. 8B is an example communication diagram illustrating an outputting of synchronized data packets using the example slave devices while utilizing the example jitter buffer of FIG. 2.

FIG. 8B is an example communication diagram 810 illustrating an outputting of synchronized data packets 812a-d using the example master device 100 and the example slave devices 104, 106 of FIG. 1, in conjunction with the timing diagram of FIG. 8A.

As shown in the example communication diagram 810 of FIG. 8A, the example master device transmits the first data packet (DATA_0) 812a including the example timestamp (T0) to the first example slave device 104 and sends the same data packet 812b with the same timestamp to the second example slave device 106. As described above, the example slave devices 104, 106 transmit ACK when the data packets are received and store the data packets in a buffer that may be popped (e.g., removed from the buffer) based on the timestamp at a later point in time. If the example slave device 104, 106 does not received a particular data packet, the example slave device 104, 106 will not transmit an acknowledgement and the example master device 100 may send the data packet with the same timestamp during a subsequent transmission.

Figure 8C:
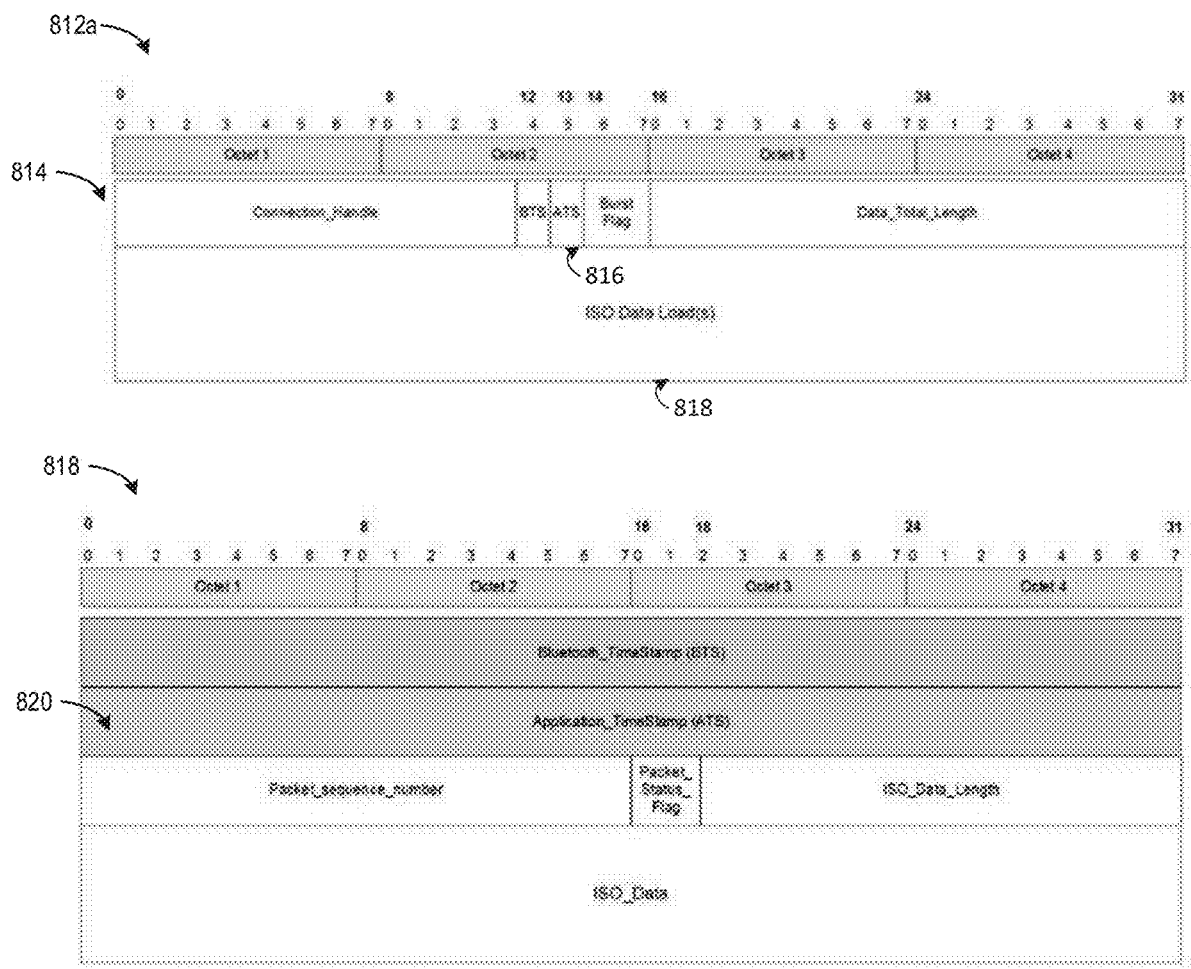
FIG. 8C is an example of one of the synchronized data packets of FIG. 8B.

FIG. 8C illustrates an example illustration of the example synchronized data packet 812a of FIG. 8B. Alternatively, any of the example synchronized data packets 812a-d may be illustrated in FIG. 8C. The example synchronized data packet 812a includes, an example header 814, an example ATS field 816 and an example isochronous (ISO) data load 818. The example ISO data load 818 includes an example ATS field 820. Although, the example data packet 812a of FIG. 8C include particular fields in a particular order, the example synchronized data packet 812a may include different fields (e.g., additional or fewer) in a different order corresponding to different number of bytes/bits.

The example synchronized data packet 812a of FIG. 2 includes an example header 814 include various field related to the ISO data load 818. For example, the header 814 includes the example ATS field 816, which is a 1 bit indicator of whether the ISO data load 818 includes an ATS/PTS. If the ATS field 816 is set to a first value (e.g., '1'), the receiving device will corresponding part, or all, of the data in the ISO data load 818 to an ATS/PTS. If the ATS field 816 is set to a second value (e.g., '0'), the receiving device will not correspond part, or all of the data in the ISO data load 818 to an ATS/PTS. Additionally or alternatively, the example header 814 includes a BTS field corresponding to a Bluetooth timestamp that may alternatively be used.

If the example ATS field 816 of FIG. 8 is set to a value that corresponds to the inclusion of the ATS in the example ISO data load 818, the example ISO data load 818 will include the example ATS 820 in the ISO data load 818. The example ISO data load 818 may additionally include other data (e., a packet sequent number, flags, IOS data length, and additional ISO data (audio data, for example)). In this manner, when the example synchronized data packet 812a is received by the example slave devices 104, 106, the example slave devices 104, 106 can decode the synchronized data packet 812a properly.

Figure 9:
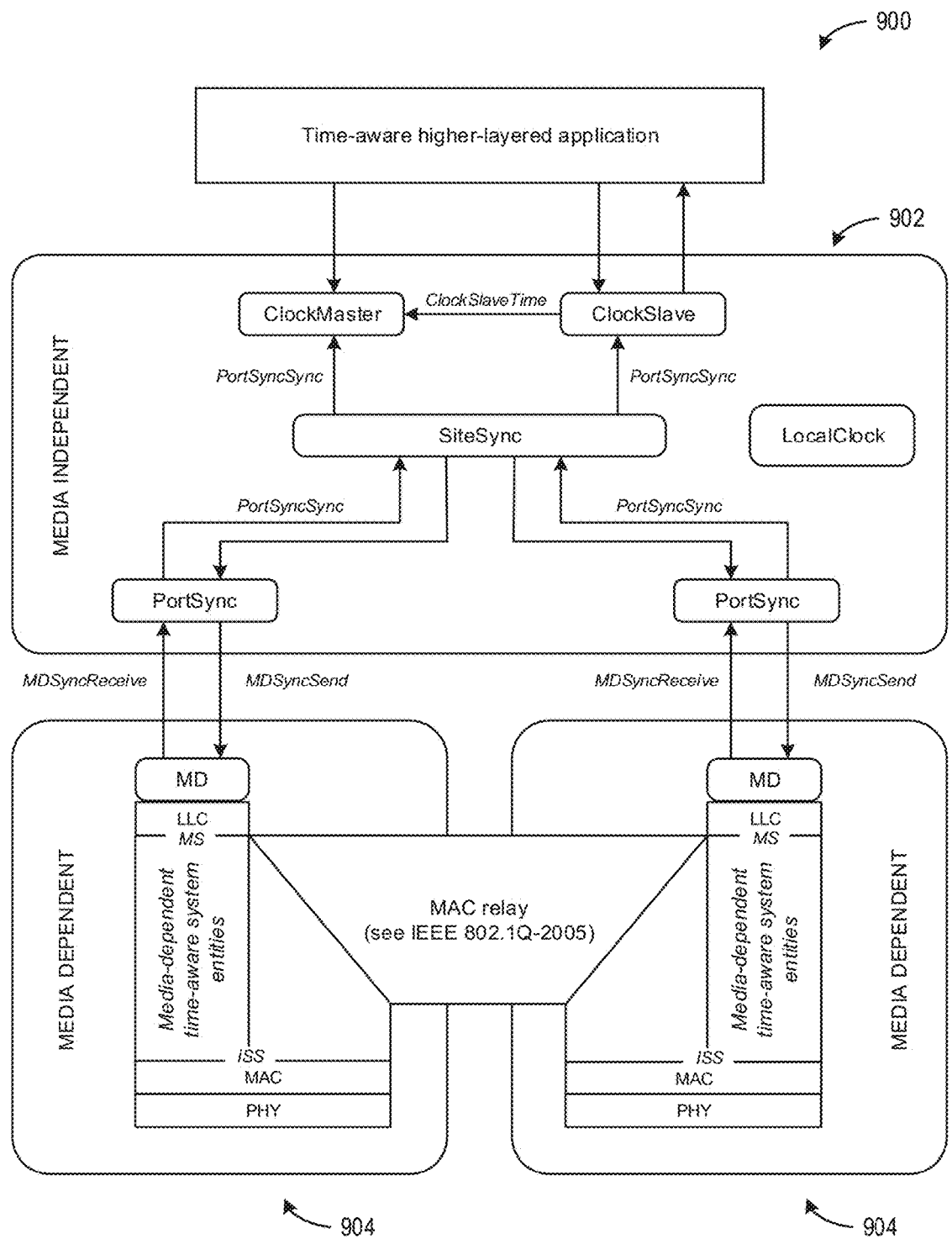
FIG. 9 is an example diagram of an 802.1AS time-aware system model for an 802.1AS protocol.

FIG. 9 is an example diagram 900 of an 802.1AS time-aware system model for the 802.1AS protocol. The example diagram includes an example media independent layer 902, and example media dependent layers 904.

The example media independent layer 902 of FIG. 9 does not depend on the lower layers, which are used to connect the slave devices 104, 106 and the master device 100 together. The example media independent layer 902 works regardless of what media dependent transport layer 904 is being used. The example media dependent layers 904 define IEEE 802.3 Ethernet using full-duplex P2P links, IEEE 802.3 EPON links, IEEE 802.11 wireless, generic coordinated shared networks, and/or Bluetooth/BLE. The MDSyncRecieve and MDSyncSend is part of the clock synchronization protocol described above in conjunction with FIG. 3.

Figure 10:
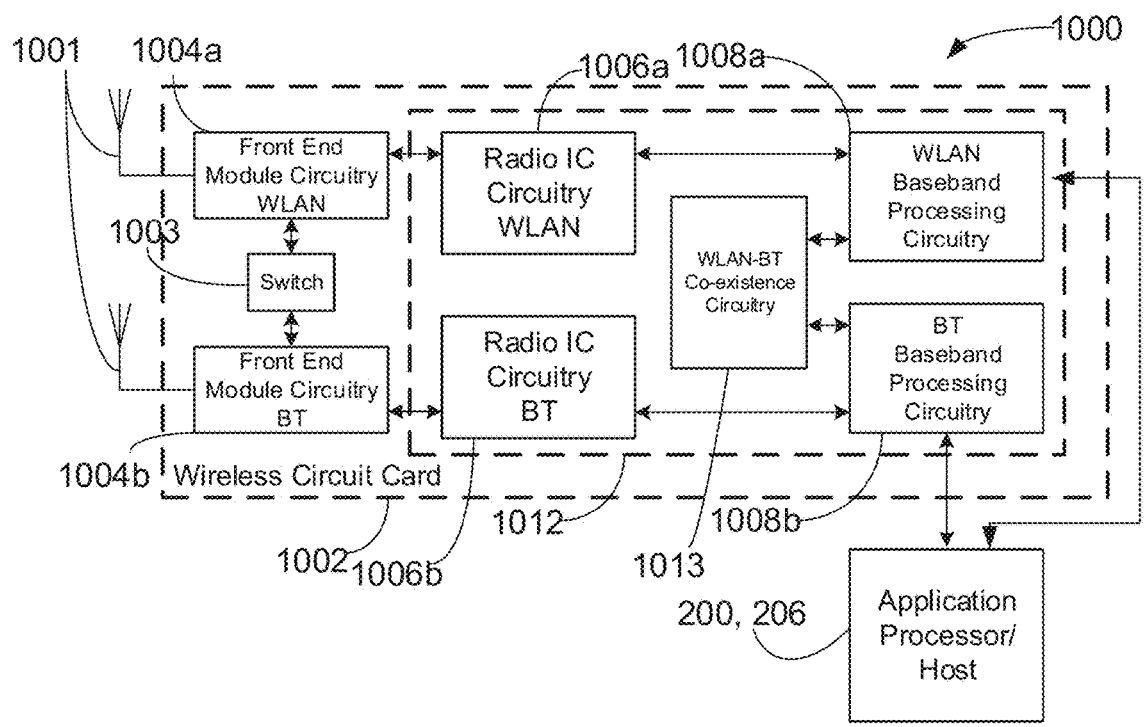
FIG. 10 is a block diagram of a radio architecture in accordance with some examples.

FIG. 10 is a block diagram of a radio architecture 1000 in accordance with some embodiments that may be implemented in the example master device 100 and/or the example slave devices 104, 106. Radio architecture 1000 may include radio front-end module (FEM) circuitry 1004a, 1004b, radio IC circuitry 1006a, 1006b and baseband processing circuitry 1008a, b. Radio architecture 1000 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a, 1004b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a, 1006b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a, b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a, 1006b, and to also generate corresponding WLAN or BT baseband signals for the transmit signal path of the radio IC circuitry 1006a, 1006b. Each of the baseband processing circuitries 1008a and 1008b may further include physical layer (PHY) and medium access control layer (MAC) circuitry, and may further interface with application processor/host 200, 206 for generation and processing of the baseband signals and for controlling operations of the radio IC circuitry 1006a, 1006b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004, the radio IC circuitry 1006a, 1006b, and baseband processing circuitry 1008a, b may be provided on a single radio card, such as wireless radio card/controller 1002 (e.g., corresponding to the example master controller 202 and/or slave controller 204 of FIG. 2). In some other embodiments, the one or more antennas 1001, the FEM circuitry 1004a, 1004b and the radio IC circuitry 1006a, 1006b may be provided on a single radio card. In some other embodiments, the radio IC circuitry 1006a, 1006b and the baseband processing circuitry 1008a, b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 1000 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1000 may be part of a Wi-Fi communication station (STA) such as a wireless access point (AP), a base station or a mobile device including a Wi-Fi device. In some of these embodiments, radio architecture 1000 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.1AS and/or 802.11ax standards and/or proposed specifications for WLANs, although the scope of embodiments is not limited in this respect. Radio architecture 1000 may also be suitable to transmit and/or receive communications in accordance with other techniques and standards.

In some embodiments, the radio architecture 1000 may be configured for high-efficiency Wi-Fi (HEW) communications in accordance with the IEEE 1102.11ax standard. In these embodiments, the radio architecture 1000 may be configured to communicate in accordance with an OFDMA technique, although the scope of the embodiments is not limited in this respect.

In some other embodiments, the radio architecture 1000 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008b may be compliant with a Bluetooth (BT) connectivity standard such as Bluetooth, Bluetooth 9.0 or Bluetooth 7.0, or any other iteration of the Bluetooth Standard. In embodiments that include BT functionality as shown for example in FIG. 10, the radio architecture 1000 may be configured to establish a BT synchronous connection oriented (SCO) link and or a BT low energy (BT LE) link. In some of the embodiments that include functionality, the radio architecture 1000 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 10, the functions of a BT radio card and WLAN radio card may be combined on a single wireless radio card, such as single wireless radio card 1002, although embodiments are not so limited, and include within their scope discrete WLAN and BT radio cards In some embodiments, the radio-architecture 1000 may include other radio cards, such as a cellular radio card configured for cellular (e.g., 5GPP such as LTE, LTE-Advanced or 10G communications).

In some IEEE 1102.11 embodiments, the radio architecture 1000 may be configured for communication over various channel bandwidths including bandwidths having center frequencies of about 900 MHz, 2.4 GHz, 5 GHz, and bandwidths of about 2 MHz, 4 MHz, 8 5 MHz, 5.5 MHz, 6 MHz, 8 MHz, 10 MHz, 40 MHz, 9 GHz, 46 GHz, 80 MHz, 100 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
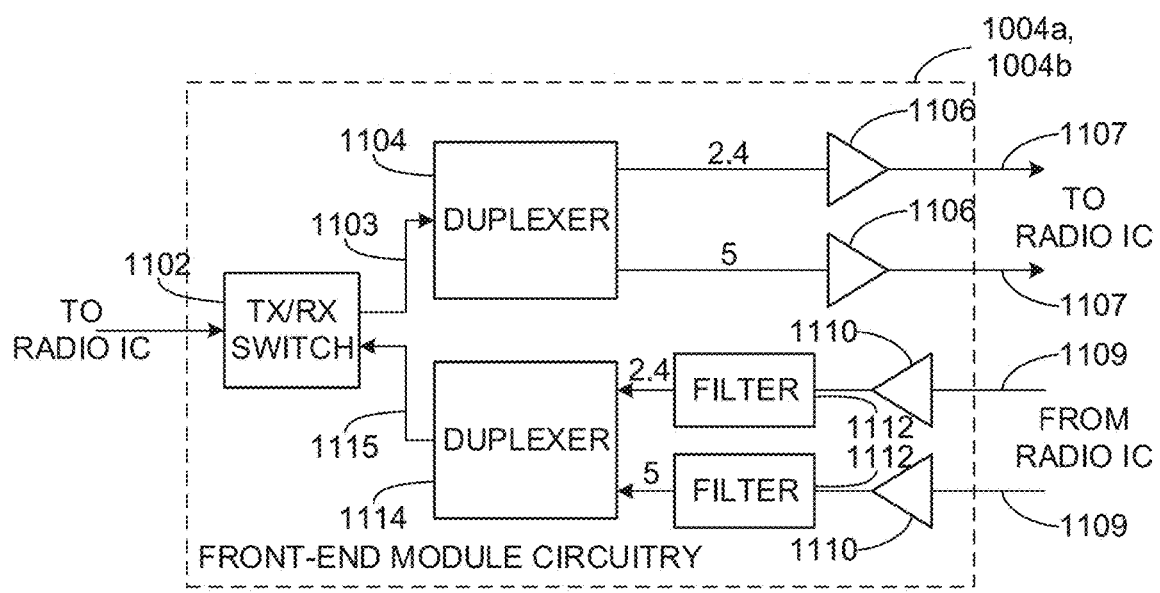
FIG. 11 illustrates an example front-end module circuitry for use in the radio architecture of FIG. 10 in accordance with some examples.

FIG. 11 illustrates FEM circuitry 1004a, 1004b in accordance with some embodiments. The FEM circuitry 1004a, 1004b is one example of circuitry that may be suitable for use as the WLAN and/or BT FEM circuitry 1004a/1004b (FIG. 10), although other circuitry configurations may also be suitable.

In some embodiments, the FEM circuitry 1004a, 1004b may include a TX/RX switch 1102 to switch between transmit mode and receive mode operation. The FEM circuitry 1004a, 1004b may include a receive signal path and a transmit signal path. The receive signal path of the FEM circuitry 1004a, 1004b may include a low-noise amplifier (LNA) 1106 to amplify received RF signals 1103 and provide the amplified received RF signals 1107 as an output (e.g., to the radio IC circuitry 1006a, 1006b (FIG. 10)). The transmit signal path of the circuitry 1004a, 1004b may include a power amplifier (PA) to amplify input RF signals 1109 (e.g., provided by the radio IC circuitry 1006a, 1006b), and one or more filters, such as band-pass filters (BPFs), low-pass filters (LPFs) or other types of filters, to generate RF signals 1115 for subsequent transmission (e.g., by one or more of the antennas 1001 (FIG. 10)).

In some dual-mode embodiments for Wi-Fi communication, the FEM circuitry 1004a, 1004b may be configured to operate in either the 2.4 GHz frequency spectrum or the 12 GHz frequency spectrum. In these embodiments, the receive signal path of the FEM circuitry 1004a, 1004b may include a receive signal path duplexer 1104 to separate the signals from each spectrum as well as provide a separate LNA 1106 for each spectrum as shown. In these embodiments, the transmit signal path of the FEM circuitry 1004a, 1004b may also include a power amplifier 1110 and a filter 1112, such as a BPF, a LPF or another type of filter for each frequency spectrum and a transmit signal path duplexer 1114 to provide the signals of one of the different spectrums onto a single transmit path for subsequent transmission by the one or more of the antennas 1001 (FIG. 10). In some embodiments, BT communications may utilize the 2.4 GHZ signal paths and may utilize the same FEM circuitry 1004a, 1004b as the one used for WLAN communications.

Figure 12:
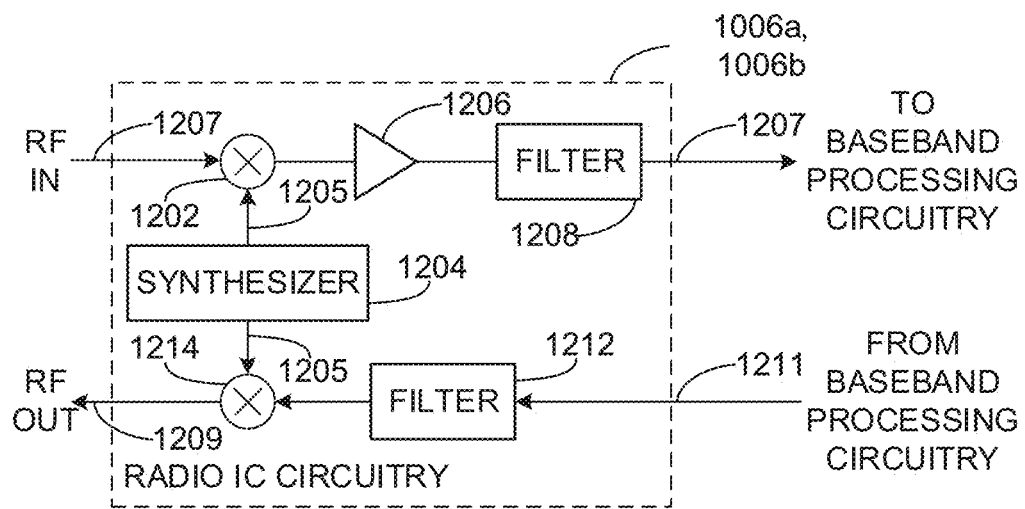
FIG. 12 illustrates an example radio IC circuitry for use in the radio architecture of FIG. 10 in accordance with some examples.

FIG. 12 illustrates radio IC circuitry 1006a, 1006b in accordance with some embodiments. The radio IC circuitry 1006a, 1006b is one example of circuitry that may be suitable for use as the WLAN or BT radio IC circuitry 1006a/1006b (FIG. 10), although other circuitry configurations may also be suitable.

In some embodiments, the radio IC circuitry 1006a, 1006b may include a receive signal path and a transmit signal path. The receive signal path of the radio IC circuitry 1006a, 1006b may include at least mixer circuitry 1202, such as, for example, down-conversion mixer circuitry, amplifier circuitry 1206 and filter circuitry 1208. The transmit signal path of the radio IC circuitry 1006a, 1006b may include at least filter circuitry 1212 and mixer circuitry 1214, such as, for example, up-conversion mixer circuitry. Radio IC circuitry 1006a, 1006b may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a, 1004b (FIG. 10) based on the synthesized frequency 1205 provided by synthesizer circuitry 1204. The amplifier circuitry 1206 may be configured to amplify the down-converted signals and the filter circuitry 1208 may include a LPF configured to remove unwanted signals from the down-converted signals to generate output baseband signals 1207. Output baseband signals 1207 may be provided to the baseband processing circuitry 1008a, b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004a, 1004b. The baseband signals 1211 may be provided by the baseband processing circuitry 1008a, b and may be filtered by filter circuitry 1212. The filter circuitry 1212 may include a LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 125% duty cycle and a 120% offset. In some embodiments, each branch of the mixer circuitry (e.g., the in-phase (I) and quadrature phase (Q) path) may operate at a 120% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-nose amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1204 may be provided by a voltage controlled oscillator (VCO), although that is not a requirement. A divider control input may further be provided by either the baseband processing circuitry 1008a, b (FIG. 10) or the application processor/host 200, 206 (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the application processor/host 200, 206.

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
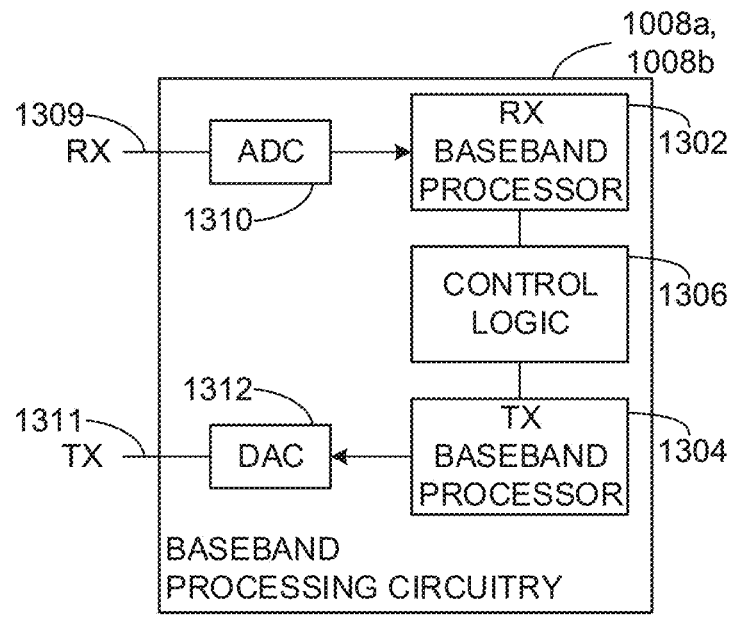
FIG. 13 illustrates an example baseband processing circuitry for use in the radio architecture of FIG. 10 in accordance with some examples.

FIG. 13 illustrates a functional block diagram of baseband processing circuitry 1008a in accordance with some embodiments. The baseband processing circuitry 1008a, b is one example of circuitry that may be suitable for use as the baseband processing circuitry 1008a, b (FIG. 10), although other circuitry configurations may also be suitable. The baseband processing circuitry 1008a, b may include a receive baseband processor (RX BBP) 1302 for processing receive baseband signals 1209 provided by the radio IC circuitry 1006a, 1006b (FIG. 10) and a transmit baseband processor (TX BBP) 1304 for generating transmit baseband signals 1211 for the radio IC circuitry 1006a, 1006b. The baseband processing circuitry 1008a, b may also include control logic 1306 for coordinating the operations of the baseband processing circuitry 1008a, b.

In some embodiments (e.g., when analog baseband signals are exchanged between the baseband processing circuitry 1008a, b and the radio IC circuitry 1006a, 1006b), the baseband processing circuitry 1008a, b may include ADC 1310 to convert analog baseband signals 1309 received from the radio IC circuitry 1006a, 1006b to digital baseband signals for processing by the RX BBP 1302. In these embodiments, the baseband processing circuitry 1008a, b may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio-architecture 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 14:
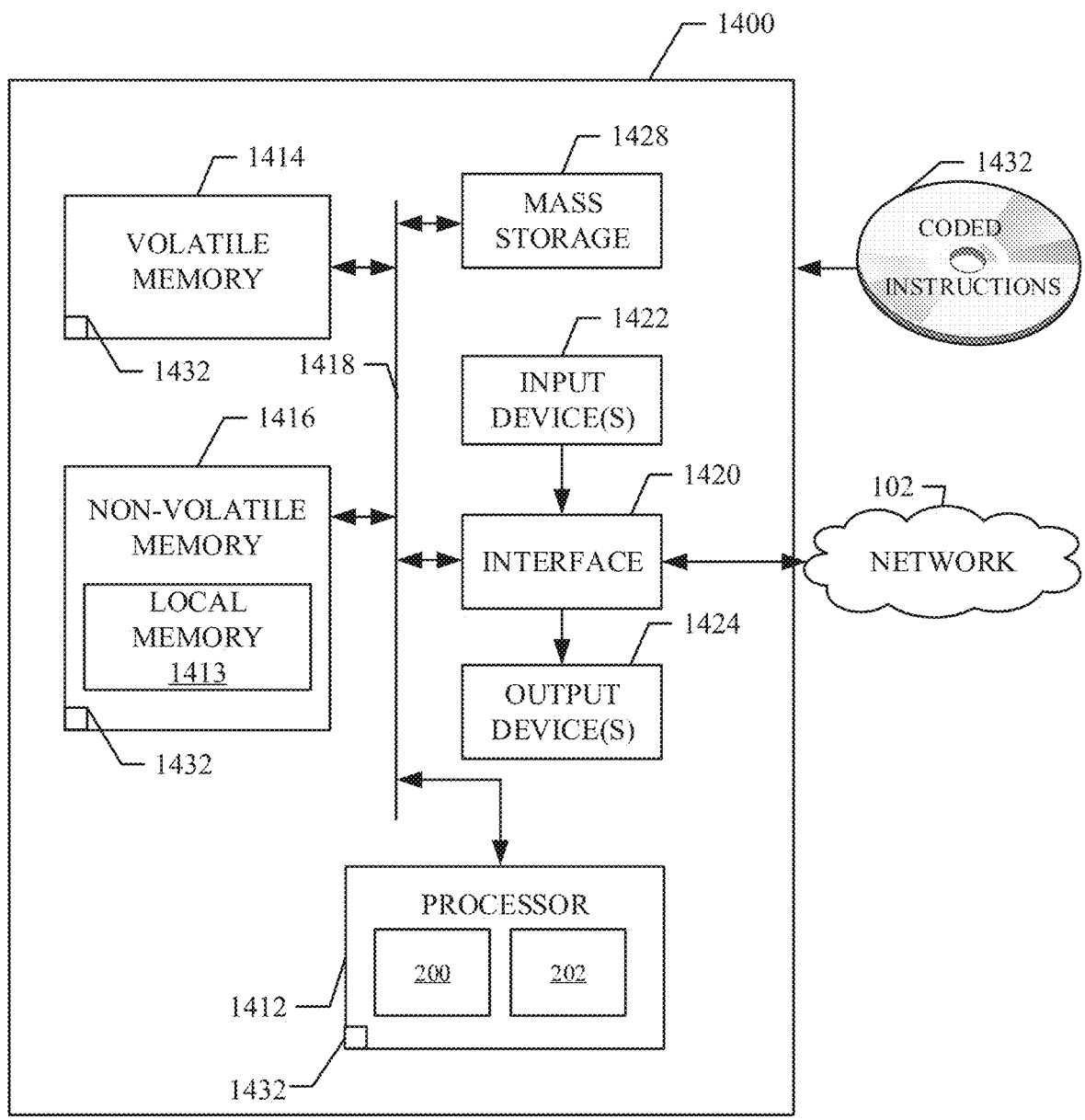
FIG. 14 is a block diagram of a processor platform structured to execute the example machine readable instructions of FIG. 4 to implement the example data synchronization transmitter of FIG. 2.

FIG. 14 is a block diagram of an example processor platform 1400 capable of executing the instructions of FIG. 4 to implement the example data synchronization transmitter 101 of FIGS. 1 and 2. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by integrated circuits, logic circuits, microprocessors or controllers from any desired family or manufacturer.

The processor 1412 of the illustrated example includes a local memory 1413 (e.g., a cache). The example processor 1412 of FIG. 14 executes the instructions of FIG. 4 to implement the example master host 200 and/or the example master controller 202 of FIG. 2. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a clock controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 102 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIG. 4 may be stored in the mass storage device 1428, in the volatile memory 1414, in the non-volatile memory 1416, and/or on a removable tangible computer readable storage medium such as a CD or DVD.

Figure 15:
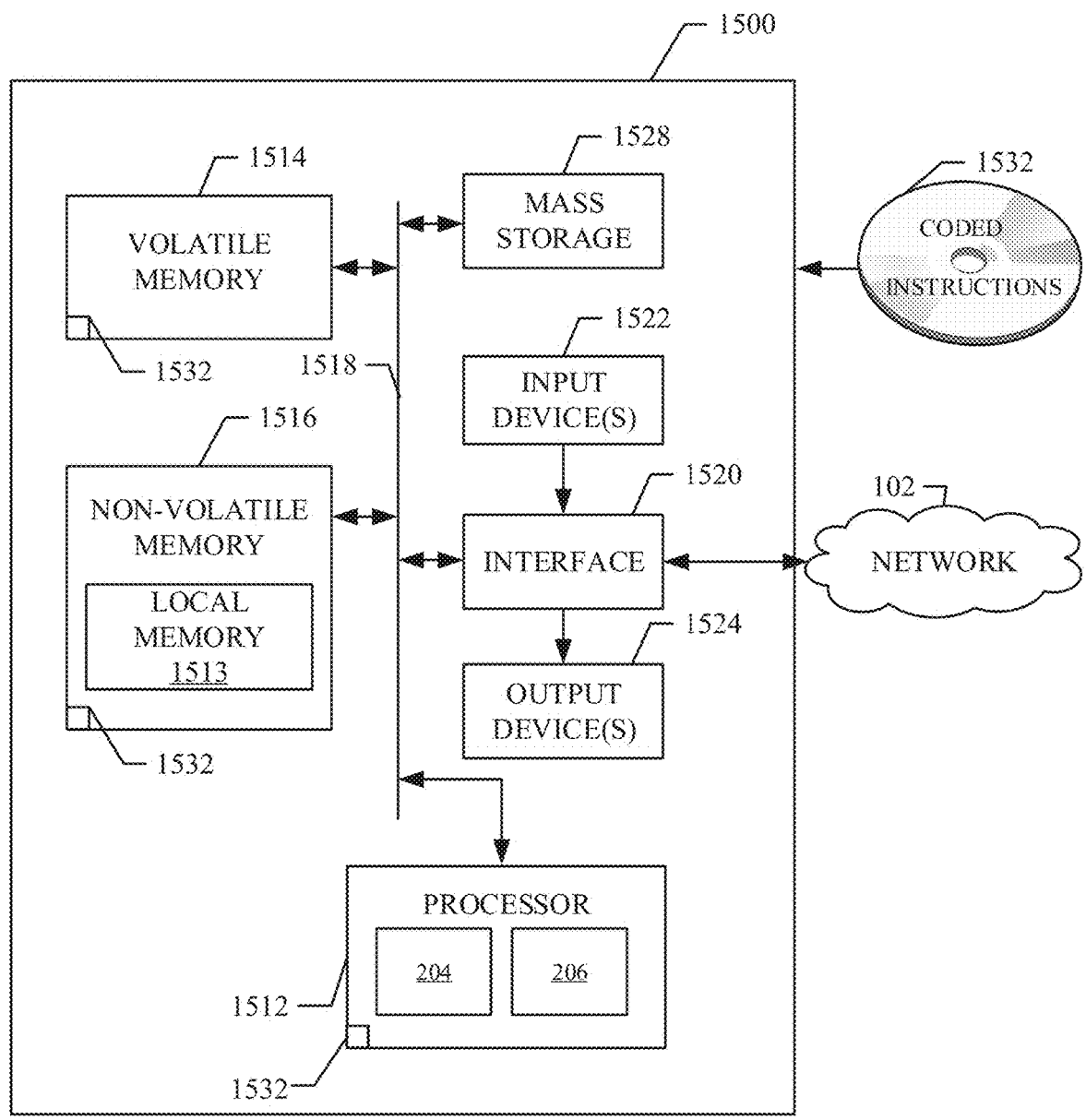
FIG. 15 is a block diagram of a processor platform structured to execute the example machine readable instructions of FIG. 5 to implement the example data synchronizer of FIG. 2.

FIG. 15 is a block diagram of an example processor platform 1500 capable of executing the instructions of FIG. 5 to implement the example data synchronizer 108 of FIGS. 1 and 3. The processor platform 1500 can be, for example, a server, a personal computer, a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by integrated circuits, logic circuits, microprocessors or controllers from any desired family or manufacturer.

The processor 1512 of the illustrated example includes a local memory 1513 (e.g., a cache). The example processor 1512 of FIG. 15 executes the instructions of FIG. 7 to implement the slave controller 204, the example slave host 206, and/or the example jitter buffer 208 of FIG. 2. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a clock controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 102 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIG. 5 may be stored in the mass storage device 1528, in the volatile memory 1514, in the non-volatile memory 1516, and/or on a removable tangible computer readable storage medium such as a CD or DVD.

It is noted that this patent claims priority from Indian Patent Application Serial Number 20174135247, which was filed on Oct. 5, 2017, and is hereby incorporated by reference in its entirety.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to facilitate time synchronization of audio, the apparatus comprising:
    a packet processor to process a data packet to identify a timestamp encoded in the data packet;
    a buffer to store the data packet and the timestamp; and
    a host to, when an amount of time after the data packet has been removed from the buffer reaches a time corresponding to a sum of the timestamp and a presentation delay time from a master device, output the data packet to render the data packet.

2. The apparatus of claim 1, wherein the packet processor is to decode the timestamp from a header of the data packet.

3. The apparatus of claim 1, wherein the host is to remove the data packet from the buffer when a threshold amount of data packets have been stored in the buffer.

4. The apparatus of claim 1, wherein the timestamp is derived from a host clock of the master device.

5. The apparatus of claim 1, further including a first clock synchronized to a host clock of the master device.

6. The apparatus of claim 1, wherein the data packet is a first data packet, the packet processor to process a second data packet to identify the presentation delay time.

7. The apparatus of claim 1, wherein rending the data packet includes outputting a payload corresponding to the data packet to a speaker.

8. A method to facilitate time synchronization of audio, the method comprising:
    processing, by executing an instruction with one or more processors, a data packet to identify a timestamp encoded in the data packet;
    storing the data packet and the timestamp in a buffer; and
    when an amount of time after the data packed has been removed from the buffer reaches a time corresponding to a sum of the timestamp and a presentation delay time from a master device, rendering the data packet.

9. The method of claim 8, further including decoding the timestamp from a header of the data packet.

10. The method of claim 8, further including remove the data packet from the buffer when a threshold amount of data packets have been stored in the buffer.

11. The method of claim 8, wherein the timestamp is derived from a host clock of the master device.

12. The method of claim 8, wherein a timer tracking the amount of time is synchronized to a host clock of the master device.

13. The method of claim 8, wherein the data packet is a first data packet, further including processing a second data packet to identify the presentation delay time.

14. A non-transitory computer readable storage medium comprising instructions which, when executed, cause one or more processors to at least:
    process a data packet to identify a timestamp encoded in the data packet; and
    store the data packet and the timestamp in a buffer; and
    when an amount of time since the data packet was removed from the buffer reaches a time corresponding to a sum of the timestamp and a presentation delay time from a master device, render the data packet.

15. The computer readable storage medium of claim 14, wherein the instructions cause the one or more processors to decode the timestamp from a header of the data packet.

16. The computer readable storage medium of claim 14, wherein the instructions cause the one or more processors to remove the data packet from the buffer when a threshold amount of data packets have been stored in the buffer.

17. The computer readable storage medium of claim 14, wherein the timestamp is derived from a host clock of the master device.

18. The computer readable storage medium of claim 14, wherein a timer tracking the amount of time is synchronized to a host clock of the master device.

19. The computer readable storage medium of claim 14, wherein the data packet is a first data packet, and wherein the instructions cause the one or more processors to process a second data packet to identify the presentation delay time.

20. The computer readable storage medium of claim 14, wherein the instructions cause the one or more processors to rend the data packet by outputting a payload corresponding to the data packet to a speaker.

\* \* \* \* \*